United States Patent [19]
Khosrowpour et al.

[11] Patent Number: 5,734,329
[45] Date of Patent: Mar. 31, 1998

[54] METHOD AND APPARATUS FOR SUPERIMPOSING SELF-CLOCKING MULTIFUNCTIONAL COMMUNICATIONS ON A STATIC DIGITAL SIGNAL LINE

[75] Inventors: Farzad Khosrowpour, Austin; Alan E. Brown, Georgetown, both of Tex.

[73] Assignee: Dell USA L.P., Austin, Tex.

[21] Appl. No.: 501,804

[22] Filed: Jul. 13, 1995

[51] Int. Cl.$^6$ ........................................ H04L 7/00
[52] U.S. Cl. .............. 340/825.21; 340/825.62; 370/499
[58] Field of Search ............ 340/825.2, 825.21, 340/825.57, 825.62, 825.07, 825.52, 825.14, 825.06; 370/499, 475

[56] References Cited

U.S. PATENT DOCUMENTS

| | | | |
|---|---|---|---|
| 3,013,147 | 12/1961 | Guerth | 370/499 |
| 4,823,124 | 4/1989 | Beauchemin | 340/825.52 |
| 4,831,358 | 5/1989 | Ferrio et al. | 340/825.52 |
| 4,908,822 | 3/1990 | Wroblewski | 340/825.07 |
| 4,967,195 | 10/1990 | Shipley | 340/825.52 |
| 5,063,371 | 11/1991 | Oyer et al. | 340/825.07 |
| 5,107,256 | 4/1992 | Ueno et al. | 340/825.07 |
| 5,166,678 | 11/1992 | Warrior | 340/825.07 |
| 5,434,862 | 7/1995 | Lokhoff | 340/825.07 |
| 5,483,230 | 1/1996 | Mueller | 340/825.07 |
| 5,537,104 | 7/1996 | Van Dort et al. | 340/825.07 |
| 5,544,037 | 8/1996 | Luger | 340/825.52 |
| 5,612,681 | 3/1997 | Funahashi et al. | 340/825.21 |

*Primary Examiner*—Michael Horabik
*Assistant Examiner*—Edward Merz
*Attorney, Agent, or Firm*—Stanford & Bennett

[57] ABSTRACT

A communication system for allowing a master to send commands to one or more slave devices across a normally static digital signal line of a bus. The master includes command logic for asserting a sequence of digital pulses according to a predetermined protocol with inherent timing to clock each data bit into a slave device. The master transmits several data bits to form each command, where each data bit is combined with clocking pulses to implement the self-clocking scheme. In particular, an initial data pulse incorporates a data bit to initiate a data phase. Each slave device includes a state machine which detects the data pulse and enables a sample and hold or latch circuit to capture the data bit. Then a clock pulse followed by a reset pulse is sent to clock the data into the slave device and reset the state machine. The slave also includes shift register logic to hold a command bit and address bits for each command. Decode logic compares the address with a predetermined code, where if a match occurs, the command bit is executed. Two masters may be included for sending superimposed pulses to two types of slave devices. One type of slave device includes pulse detection circuitry for detecting positive going pulses on the static digital line, and the other type detects negative going pulses.

25 Claims, 6 Drawing Sheets

METHOD AND APPARATUS FOR SUPERIMPOSING SELF-CLOCKING MULTIFUNCTIONAL COMMUNICATIONS ON A STATIC DIGITAL SIGNAL LINE

FIELD OF THE INVENTION

The present invention relates to digital communication, and more particularly to a method and apparatus for superimposing self-clocking multifunctional communications on a single conductor normally used as a static digital signal.

DESCRIPTION OF THE RELATED ART

Amplitude and frequency superposition techniques are common in communication to improve bandwidth allocation, or channel utilization. However, there are many applications where bandwidth is not the determining factor for increasing communications on an existing channel. In many applications, such as the computer and automobile industries, it is often desired to minimize external wiring or to increase the functionality or capacity of existing wiring. For example, it may be desired to have one or two bus masters to asynchronously communicate with one or more slave systems for a computer server management system without affecting the existing bus cabling between the devices.

Universal asynchronous remote transmitter (UART) communication links are common for multiple slave configurations using a single or dual line interface. However, such UART interfaces are expensive, consume valuable space and power and often require complex software intervention and initialization. Furthermore, such interfaces often require external clocks for synchronization between master and slave devices in order to assure that the frequency of the clock is matched at both transmitter and receiver ends. Synchronous solutions, such as the I²C bus by Phillips, require more than one electrical wire. Known self-clocking and coding schemes, such as Manchester Encoding, are very expensive to implement. Such high cost and complicated communication techniques are not suitable for low power and low cost applications.

A known server management bus (SMB) includes an I²C bus including data and clock signals, as well as several other signals, such as a ground and a present signal. The present signal provides low level detection of a master among a plurality of slave systems. This scheme is used for server management systems, including a plurality of slave computers coupled to a master server system. A similar application is a primary computer system interface to a plurality of hard disk drives or a disk array, such as a redundant array of inexpensive disks (RAID) topology. The present signal is often used to indicate whether the local slave or master device is in stand-alone, slave, or master mode.

It is desired to use the same cabling and connectors in an existing SMB system while increasing communications capacity. Such increased communications could be used for power cycling, power sequencing, periodic interrupts, or a variety of other types of functions. For example, it may be desired to remotely cycle power on and off small computer systems interface (SCSI) disk pods. It is desired to provide such communication with low cost and low power consumption and without requiring complex software schemes or adding external clocking circuitry.

SUMMARY OF THE INVENTION

A communications system according to the present invention includes up to two master devices, each having a driver for asserting command pulses on the typically static signal line, and at least one slave device including a pulse detection circuit for detecting the command pulses and a command decode circuit for retrieving and decoding the commands. The present invention is suitable for a master/slave system including a standard cable with a static digital signal line for indicating the presence or absence of the master.

The master includes command logic for asserting a sequence of digital transitions or pulses according to a predetermined protocol with inherent timing to clock the data into a slave device. The master transmits several data bits implementing a command, where each bit is combined with clocking pulses. In particular, an initial data pulse incorporates a data bit to initiate a data phase. Then, at least one clock pulse is provided for clocking the data into the slave device. A final reset pulse resets the slave to receive more data bits. This completes transmission of a single bit, where the sequence is repeated for each data bit to be sent. In the preferred embodiment, each command includes a command bit followed by several address or decode bits. The slave preferably includes decode logic to interpret the address for a valid command, and if properly addressed, the command bit is used to perform the desired function.

Each slave device preferably includes a sample circuit for sampling each data bit when the sample circuit is enabled. A memory device is provided for storing each data bit. Also, control logic detects the data pulse, enables the sample circuit for sampling the data bit, detects the clock pulse to disable the sample circuit and enable the memory, and detects the reset pulse for resetting the slave to receive another data bit. Preferably, the master sends a plurality of data bits forming a command, where each command includes at least one command bit and corresponding address bits. The slave device includes an output flip-flop for receiving and asserting the command bit. The memory of the slave device is preferably shift memory, which receives the data bits one at a time until filled with the address. Decode logic compares the address in the memory with a predetermined address or code, and enables the output flip-flop to receive the command bit if the address matches the predetermined code. The control logic controls the process of clocking and enabling the components to receive and store the command.

More particularly, the command logic of each slave device includes a simple state machine for receiving and properly sequencing through the data and clocking pulses for each data bit. The state machine enables a sample and hold or latch circuit when the initial data pulse is asserted. The incorporated data bit is then captured by the sample and hold circuit. The subsequent pulses clock the state machine for enabling shift register logic to capture and shift each data bit. A discharge period is inserted between each series of pulses to clear the sample and hold circuit. If the address bits meet the predetermined code, the output flip-flop is enabled and the reset pulse clocks the command bit to the output to perform the command.

The sample and hold circuit preferably comprises a resistor-capacitor circuit for sampling the data bit and a Schmitt trigger buffer for shaping and asserting the sampled data bit. A rectifier detects the data bit, a first resistor is used to charge the capacitor if the data bit is high, and a second resistor discharges the capacitor, if necessary, after the reset pulse. The Schmitt trigger buffer preferably comprises two series coupled Schmitt trigger inverters for asserting the data bit stored in the capacitor.

According to one embodiment of the present invention, the master includes a field effect transistor (FET) driver for asserting digital pulses on a normally static present detect signal line, where such pulses are ignored by the standard detection circuitry used by a slave to detect the presence or absence of the master device. Each slave includes a pulse detection circuit which detects the pulses or command signals and develops a corresponding digital signal to the command decode circuit. In this manner, the master is able to assert one or more commands across the normally static digital signal line.

In a second embodiment according to the present invention, two masters and two corresponding types of slave devices are attached to the present signal of the management bus, where positive going pulses are asserted by a first master and negative going pulses are asserted by a second master. Diodes, enhancement mode FETs and Schmitt trigger devices are incorporated within the first type of slave devices for detecting the positive pulses but ignoring or rejecting the negative pulse. A diode, a depletion mode device and a Schmitt trigger device are incorporated within the second type of slave device for detecting the negative pulses but rejecting the positive pulses. The Schmitt trigger devices add hysteresis for purposes of pulse data shaping to assure sharp pulse transitions. Alternatively, such detection circuit may be implemented using hysteresis inverter circuits. In this manner, the first master communicates with the slave devices of the first type and the second master communicates with slave devices of the second type.

In this manner, a communication is established between up to two masters and one or more slave devices without changing a standard cable interface. The command bits are asserted according to a predetermined, self-clocking timing scheme, thereby eliminating the need for external clock circuitry. The command set may include commands for power cycling, power sequencing, periodic interrupts, etc. as well as more sophisticated commands for performing any desired functions of the slaves.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
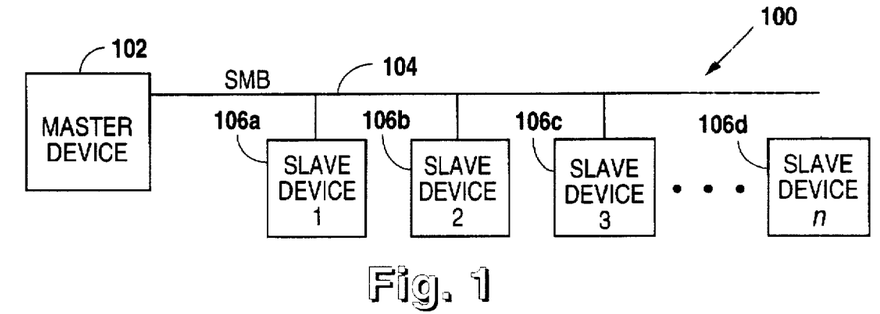
FIG. 1 is a simplified block diagram of a communications system according to the present invention, including a single master and one or more slave devices.

Referring now to FIG. 1, a simplified block diagram is shown of a communication system 100 according to one embodiment of the present invention. A master device 102 is coupled to a plurality of slave devices 106a, 106b, 106c, 106d, etc. through a server management bus (SMB) 104. The SMB 104 includes a plurality of signal lines within a cable for coupling the master 102 to the slave devices 106a–d. The SMB 104 may therefore be implemented using a standard cable where it is desired to add communications across the SMB 104 without changing the standard cable.

Figure 1A:
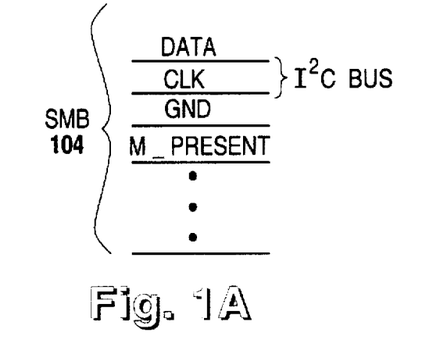
FIG. 1A illustrates the individual signals of the server management bus of FIG. 1.

FIG. 1A illustrates some of the signals of the SMB 104. In particular, the SMB 104 includes data and clock signals according to the $I^2C$ bus standard by Phillips, and also includes a ground and M_PRESENT signal, along with a plurality of other signals as desired. The M_PRESENT signal is typically used both in systems according to prior art and according to the present invention for signaling to the slave devices 106a–d to indicate that the master 102 is present and powered on. The slave devices 106a–d correspondingly power up or down based on the status of the master device 102.

For example, the M_PRESENT signal may be statically asserted high or low by the master device 102 for indicating to the slave devices 106a–d that the master device 102 is or is not present and powered on, respectively. The slave devices 106a–d correspondingly power up when the master device 102 is powered up. Alternatively, the M_PRESENT signal may be used to indicate to the slave devices 106a–d whether the master device 102 is present or not, indicating whether the slave devices should operate in slave mode or in stand-alone mode, respectively, based on the present status of the master device 102. Thus, the M_PRESENT signal is generally a static digital signal which is simply asserted low or high.

In the communications system 100 according to the present invention, however, the master device 102 further includes means for sending commands to the slave devices 106a–d using the M_PRESENT signal line. In this manner, communication is established between the master device 102 and the slave devices 106a–d using the M_PRESENT signal line without otherwise affecting the static functionality. Furthermore, the communications are sent on an existing signal line, so that the cable incorporating the SMB 104 need not be modified. Such a system is very low cost and consumes very little power as further described below.

Figure 2:
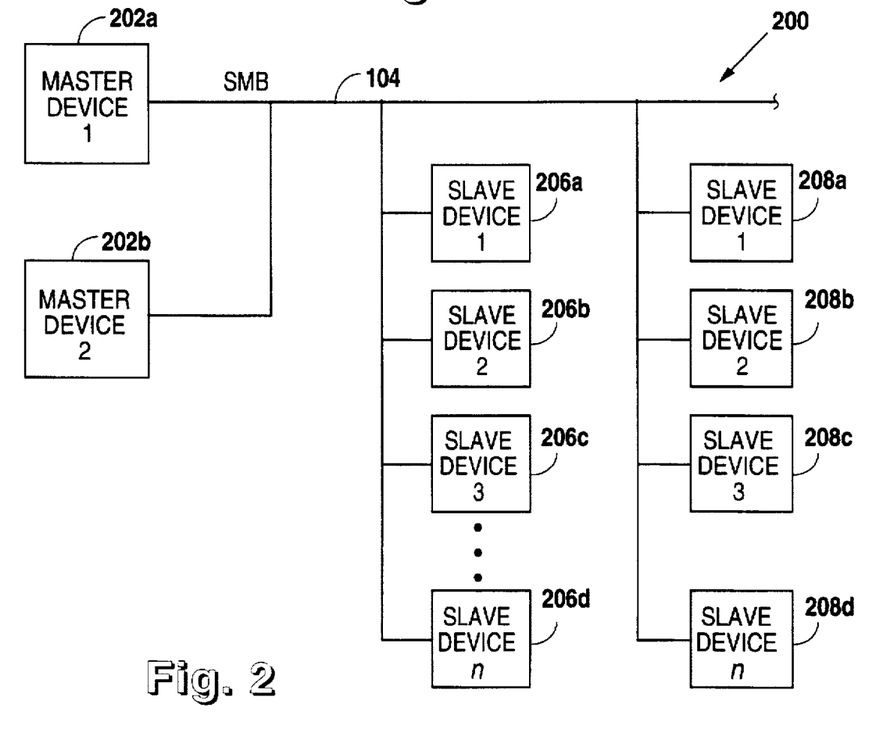
FIG. 2 is a simplified block diagram of another communication system according to the present invention including two master devices and two types of slave devices, all connected to the same management bus.

Referring now to FIG. 2, a communications system 200 according to an alternative embodiment is shown. The communications system 200 includes two master devices 202a and 202b connected to the SMB 104, which is further coupled to a plurality of slave devices 206a, 206b, 206c, 206d, etc., generally referred to as the slave devices 206a–d or simply 206. The slave devices 206 are implemented according to one type of slave device for receiving commands from the master 202a. The SMB 104 is further connected to several more slave devices 208a, 208b, 208c, 208d, etc., generally referred to as the slave devices 208a–d or simply 208, which are implemented according to a second type of slave device for receiving commands from the master 202b. In this manner, the same SMB 104 interface is used to allow communication between up to two types of master/slave systems using the same cable. As will be described further below, the M_PRESENT signal static line is used for all communication purposes.

Figure 3:
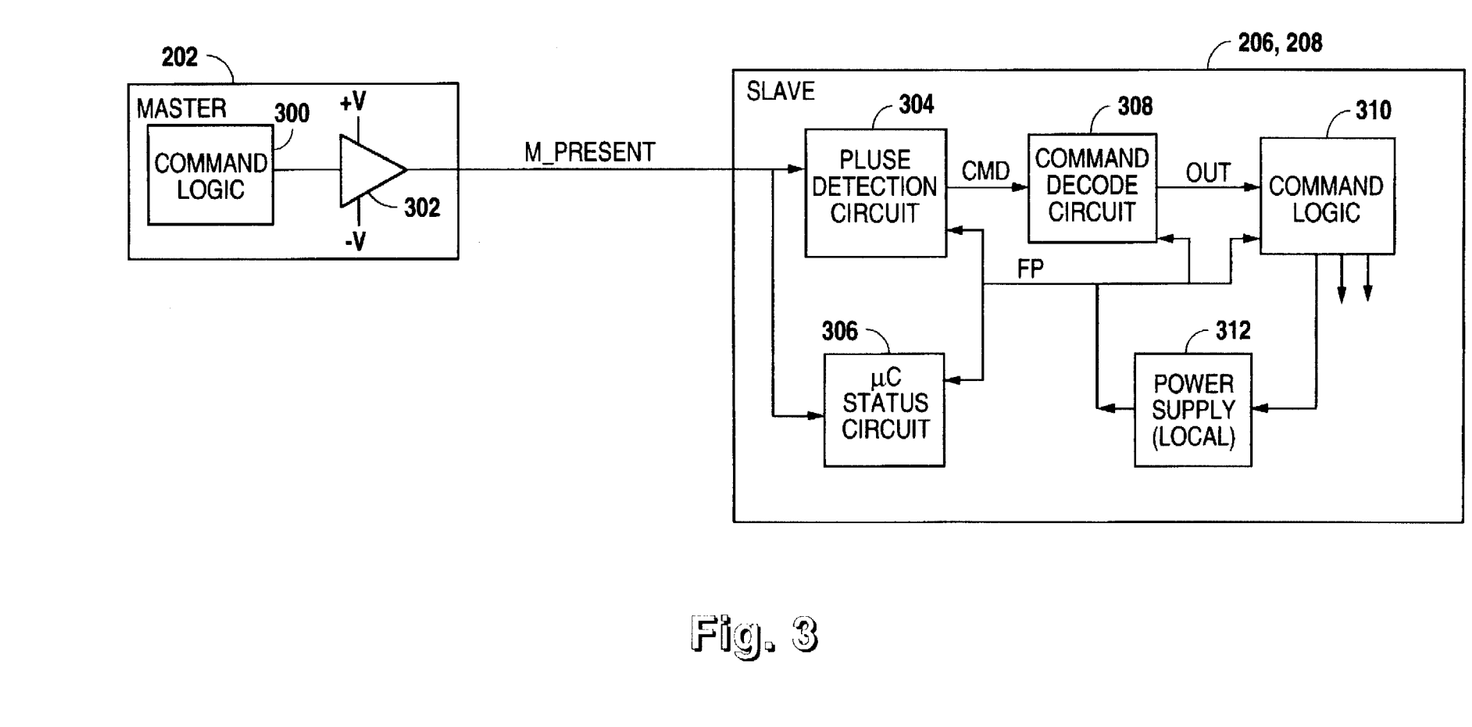
FIG. 3 is a more detailed block diagram of the master and slave devices of FIGS. 1 and 2.

Referring now to FIG. 3, a simplified block diagram is shown of the interface between a master device 202, which is implemented either as a master device 102, 202a or 202b, and a slave device implemented as any of the slave devices 106a–d, 206 or 208, although it will be referred to herein-after as the slave device 206 or 208, since the slave devices 106a–d are of either type. The master device 202 includes command logic 300 for asserting command data bits to a driver 302, which asserts corresponding command pulses on the M_PRESENT signal. The driver 302 is preferably a FET-type driver, an amplifier, or any equivalent driver for asserting signals on a bus conductor. The command signal pulses are preferably asserted as a series of positive going pulses or negative going pulses, depending upon whether the master device 202 is the device 202a or 202b. The self-clocking communication protocol is described below.

The slave device 206 or 208 includes a pulse detection circuit 304 coupled to the M_PRESENT signal for asserting command bits on a single line CMD to a command decode circuit 308. A microcontroller status circuit 306 is also connected to the M_PRESENT signal for detecting the presence or absence of the master 202. In particular, the microcontroller status circuit 306 uses the M_PRESENT signal in the static or DC sense to determine whether the slave device 206 or 208 is in stand-alone, slave or master mode of operation. Thus, this signal is used during low level boot-up before the SMB 104 protocols are established. An idle period is preferably inserted between each data transmission so that the microcontroller status circuit 306 generally ignores the command pulses asserted on the M_PRESENT signal.

The command decode circuit 308 includes a shift register (FIG. 6) receiving the command bits for determining the particular command received, where the command decode circuit 308 is further connected to command logic 310 for performing a particular command received. For example, one signal may be connected to a local power supply 312 of the slave device 206 or 208 for powering up or down based upon the command. The power supply 312 preferably asserts a low power signal FP to the other components while the slave device 206 or 208 is powered off. Other commands are contemplated, such as the desire for power cycling, power sequencing, or periodic interrupts, or any other types of commands as desired.

Figure 4:
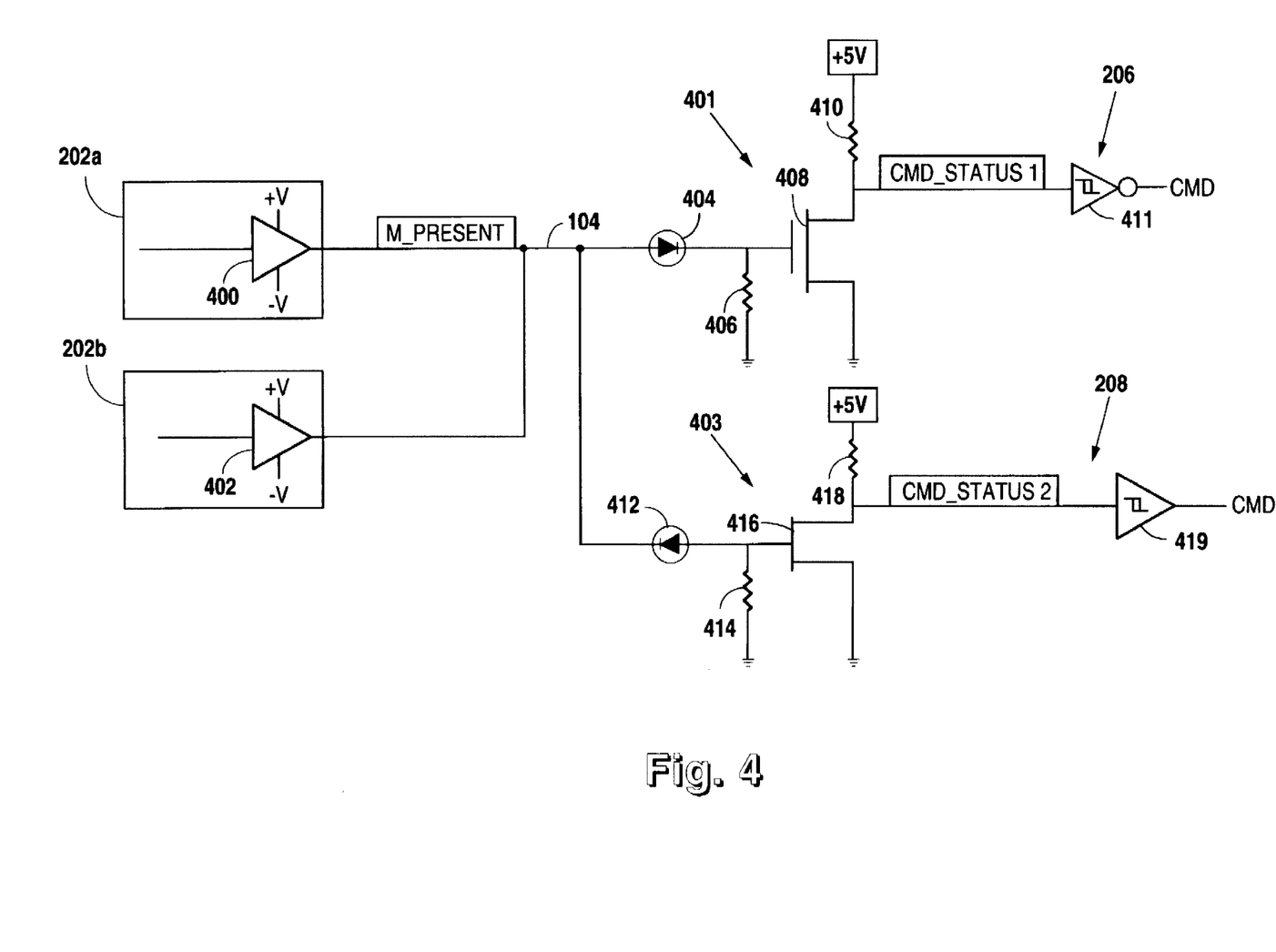
FIG. 4 is a detailed schematic diagram of one embodiment of the pulse detection circuit of FIG. 3.

Referring now to FIG. 4, a more detailed schematic diagram is shown of the interface between the master devices 202a, 202b and the slave devices 206 and 208. A driver 400 is provided in the master device 202a and another driver 402 is provided in the master device 202b, which are both implemented in a similar manner as the driver 302 shown in FIG. 3, such as FET drivers or the like. However, the driver 400 asserts five-volt positive pulses on the M_PRESENT signal for communicating with a pulse detection circuit 401 within the slave device 206, and the driver 402 within master device 202b asserts five-volt negative pulses for communicating with a pulse detection circuit 403 within the slave device 208. It is understood that the voltage level depends on the particular implementation and is merely an incidental design consideration.

In particular, the pulse detection circuit 401 includes a diode 404 having its anode receiving the M_PRESENT signal and its cathode connected to one side of a resistor 406 and to the gate of an N-channel enhancement mode field-effect transistor (FET) 408. The other end of the resistor 406 and the source of the FET 408 are connected to ground. The drain of the FET 408 asserts a signal CMD_STATUS1, which is provided to one end of a resistor 410, having its other end receiving a five volt power signal, referred to as +5V. The CMD_STATUS1 signal is inverted by a Schmitt trigger inverter 411, which asserts a signal CMD.

The M_PRESENT signal is also provided to the cathode of a diode 412 within the pulse detection circuit 403, where the diode 412 has its anode provided to one end of a resistor 414 and to the gate of an N-channel depletion mode FET 416. The other end of the resistor 414 and the source of the FET 416 is connected to ground and the drain of the FET 416 asserts a signal CMD_STATUS2, which is provided to one end of a resistor 418, receiving the +5V signal at its other end. The CMD_STATUS2 signal is provided through a Schmitt trigger buffer 419, which asserts a signal CMD.

The Schmitt trigger devices 411 and 419 include hysteresis for shaping the pulses provided on the CMD signal for both pulse detection circuits 401, 403. The buffer 419 could also be an inverter, but the CMD signal would then have the reverse polarity as the corresponding CMD signal within the pulse detection circuit 401. For purposes of clarity, the CMD signals have the same polarity.

The M_PRESENT signal is maintained at zero volts (0V) in the static condition, so that the CMD_STATUS1 signal is initially high and the CMD_STATUS2 is initially low, and thus both CMD signals are initially low. When the driver 400 asserts a positive pulse on the M_PRESENT signal, the pulse forward biases the diode 404 and activates the FET 408. This correspondingly grounds the CMD_STATUS1 signal, thereby creating a positive pulse on the corresponding CMD signal. Since the diode 412 remains reverse-biased, the pulse detection circuit 403 within the slave 208 remains unaffected.

When the driver 402 asserts a negative pulse on the M_PRESENT signal, the diode 412 is forward biased and the depletion mode FET 416 is turned off, thereby asserting both the CMD_STATUS2 signal and the corresponding CMD signal high. Thus, a negative pulse on the M_PRESENT signal asserted by driver 402 causes a corresponding positive pulse on the CMD signal within the slave 208. However, a negative pulse on the M_PRESENT signal does not otherwise affect the pulse detection circuit 401 of the slave device 206 since the diode 404 remains reverse-biased. In this manner, the master 202a may communicate with a plurality of slave devices 206a–d without affecting the slave devices 208a–d, and the master 202b may communicate to a plurality of slave devices 208a–d without affecting the slave devices 206a–d.

Figure 5:
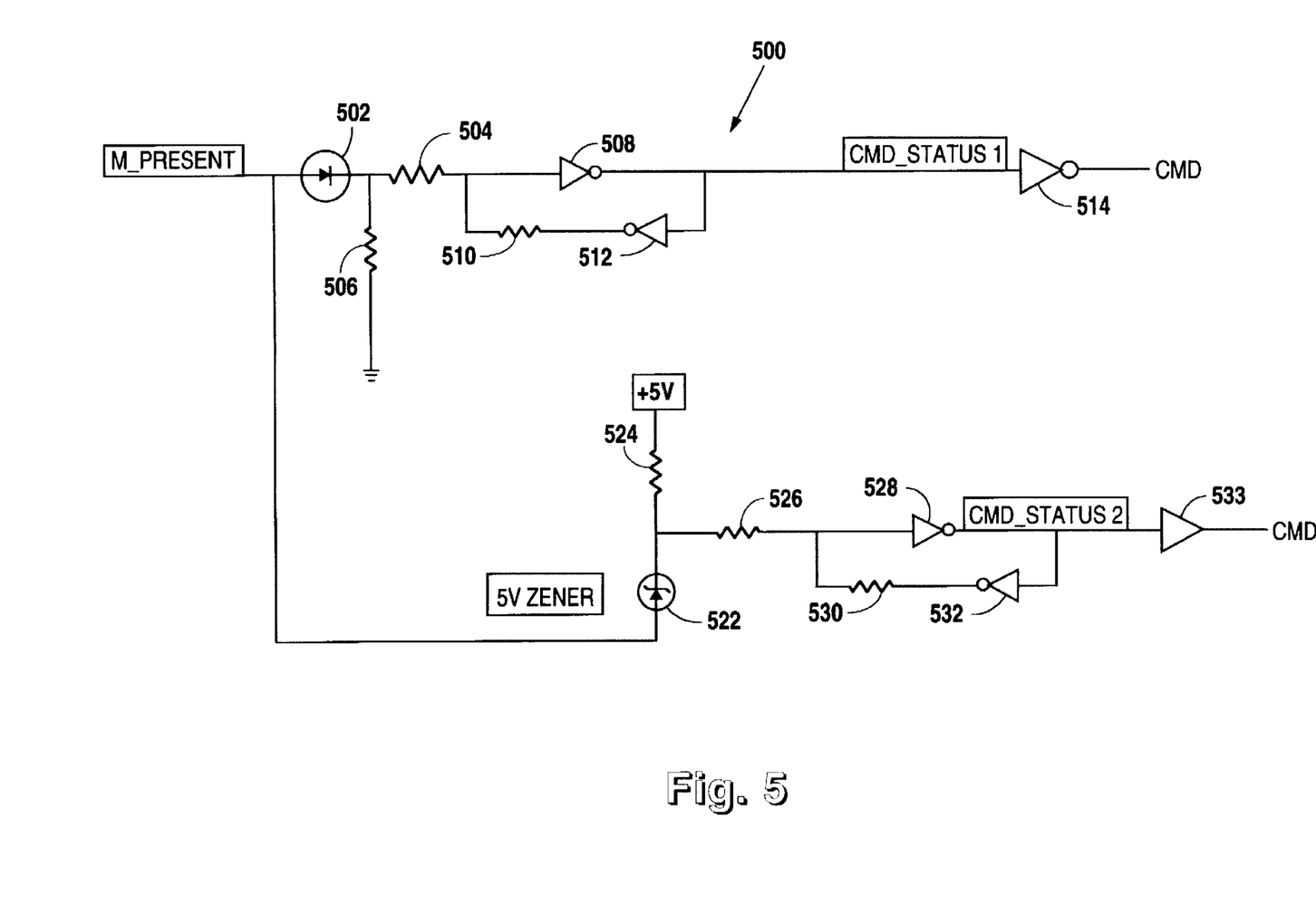
FIG. 5 is a schematic diagram of an alternative embodiment of the pulse detection circuit of FIG. 3.

Referring now to FIG. 5, a schematic diagram is shown of an alternative embodiment of the pulse detection circuits within the slaves 206 and 208. A pulse detection circuit 500 detects positive going pulses for slave devices 206 and a pulse detection circuit 520 detects negative pulses for the slave devices 208. A diode 502 receives the M_PRESENT signal at its anode and has its cathode connected to one end of two resistors 504 and 506. The other end of resistor 506 is connected to ground, and the other end of resistor 504 is provided to the input of an inverter 508 and to one end of a resistor 510 of a hysteresis feedback circuit. The output of the inverter 508 provides the CMD_STATUS1 signal, which is further provided to the inputs of an inverter 512 and an inverter 514. The output of the inverter 512 is connected to the other end of the resistor 510. The CMD_STATUS1 signal is normally high, but is pulsed low with a positive going pulse on the M_PRESENT signal through the inverter 508. The corresponding CMD signal is thus normally low, but pulsed high with positive pulses on the M_PRESENT signal. The inverter 512 and resistors 504, 510 serve to provide a hysteresis feedback for purposes of pulse shaping. The amount of hysteresis is determined by the values of the resistors 504, 510.

The M_PRESENT signal is also provided to the anode of a 5V Zener diode 522, having its cathode connected to one end of a resistor 526 and to one end of a resistor 524. The other end of the resistor 524 receives the +5V signal and the other end of the resistor 526 is provided to the input of an inverter 528 and to one end of a resistor 530. The output of inverter 528 provides the CMD_STATUS2 signal, which is provided to the input of another inverter 532, having its output connected to the other end of the resistor 530. A buffer 533 receives the CMD_STATUS2 signal and asserts a corresponding CMD signal. The buffer 533 is not necessary, but is provided for consistency with the pulse detection circuits 401, 403 of FIG. 4. While the M_PRESENT signal is normally at ground, the Zener diode 522 maintains five volts or a logic high at the input of inverter 528, so that the CMD_STATUS2 and CMD signals are normally pulled low. A negative going pulse on the M_PRESENT signal asserting a negative 5V at the anode of the Zener diode 522 causes the junction between resistors 524 and 526 to go to zero, so that the inverter 528 asserts the corresponding CMD signal high. In this manner, positive pulses on the M_PRESENT signal cause corresponding positive pulses on the CMD signal of the pulse detection circuit 500, and negative pulses on the M_PRESENT signal cause corresponding positive pulses on the CMD signal of the pulse detection circuit 520, in a similar manner as described for FIG. 4.

Figure 6:
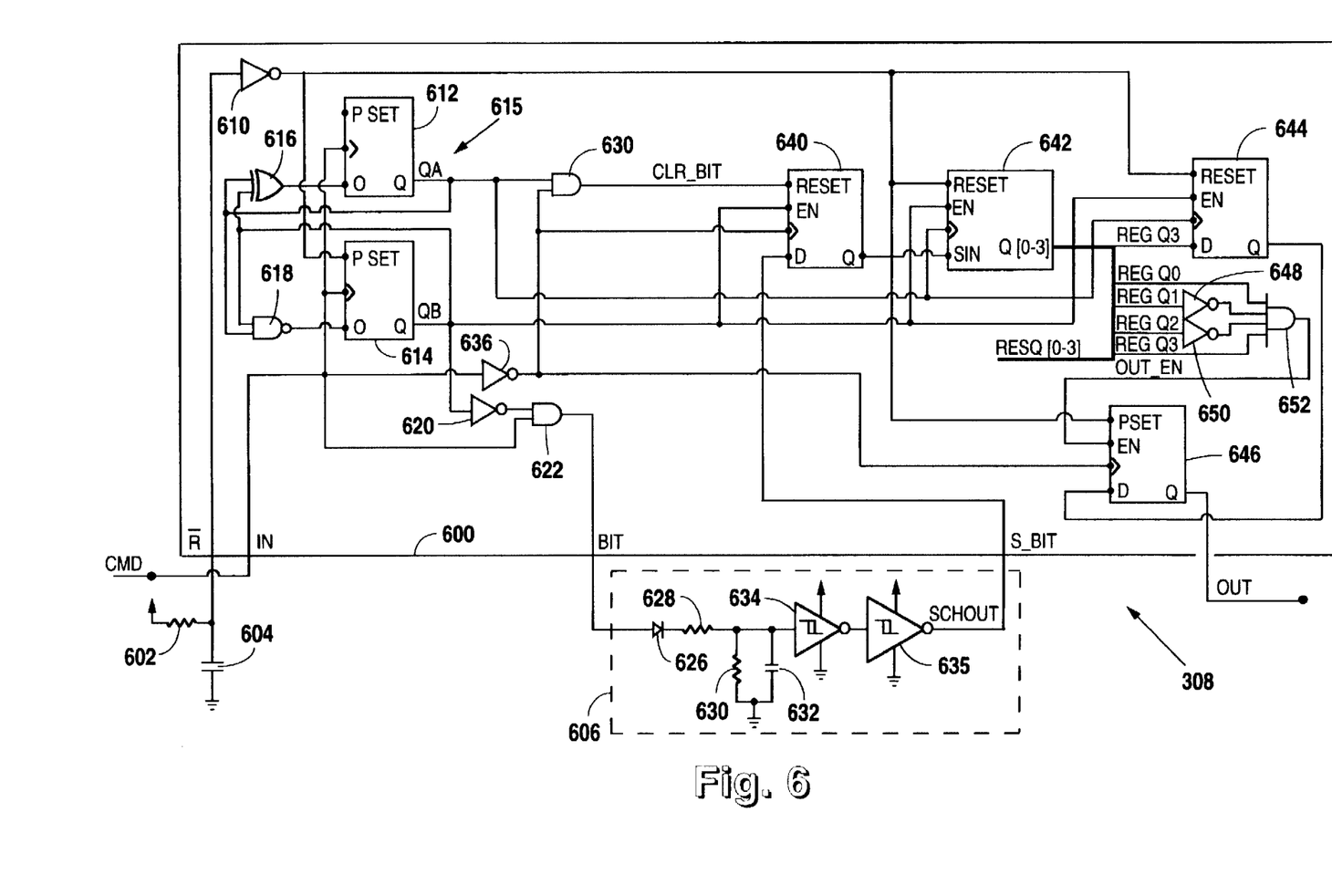
FIG. 6 is a schematic diagram of the command decode circuit of FIG. 3.

Referring now to FIG. 6, a more detailed schematic diagram is shown of the command decode circuit 308. The primary portion of the circuitry is preferably incorporated into a programmable array logic (PAL) 600, which is further connected to a sample and hold circuit 606 and an RC reset circuit. The sample and hold circuit 606 could alternatively be implemented using a latch and other support logic if desired. The RC reset circuit includes a resistor 602, having one end pulled high and the other end connected to one end of a capacitor 604 and to the inverted reset input of the PAL 600. The other end of the capacitor 604 is coupled to ground. The inverted reset input of the PAL 600 is provided to the input of an inverter 610 within the PAL 600, having its output asserting a signal RESET, which is provided to the preset inputs of two D-type flip-flops 612 and 614. The CMD signal generally refers to the corresponding signal of either of the slave devices 206 or 208. In either case, the CMD signal is normally low and pulsed high to send communication pulses.

The CMD signal is provided to the input of the PAL 600, which is internally provided to the clock inputs of the flip-flops 612 and 614, to the input of an inverter 636 and to one input of a two-input AND gate 622. The Q output of flip-flop 612, referred to as a signal QA, is provided to one input of a two-input exclusive-OR (XOR) gate 616 and to one input of a two-input NAND gate 618. The Q output of the flip-flop 614, referred to as a signal QB, is provided to the input of an inverter 620 and also to the other inputs of the XOR gate 616 and the NAND gate 618. The output of the XOR gate 616 is provided to the D input of the flip-flop 612 and the output of the NAND gate 618 is provided to the D input of the flip-flop 614.

The output of the inverter 620 is provided to the other input of the AND gate 622, which asserts a signal BIT as an output of the PAL 600. The BIT signal is provided to the anode of a diode 626 within the sample and hold circuit 606. The cathode of the diode 626 is provided to one end of a resistor 628, having its other end provided to one end of a resistor 630, to one end of a capacitor 632 and to the input of another Schmitt trigger inverter 634. The other ends of the resistor 630 and the capacitor 632 are connected to ground. It is noted that the capacitor 632 charges through the resistor 628 and discharges through the resistor 630. Preferably, the resistor 628 has a relatively small resistance for quickly charging the capacitor 632, and the resistor 630 has a larger resistance to enable the capacitor 632 to hold its charge for a certain period of time. The output of the inverter 634 is provided to the input of another Schmitt trigger inverter 635, which asserts a signal SCHOUT at its output. The SCHOUT signal is provided to a sampled bit (S_BIT) input of the PAL 600, which is internally provided to the D input of a D-type flip-flop 640.

The output of the inverter 636 is provided to one input of a two-input AND gate 638, to the clock input of the flip-flop 640 and to the clock input of another D-type flip-flop 646. The flip-flop 646 asserts a signal OUT as the output of the PAL 600. The QA signal is provided to the other input of the AND gate 638, to the clock input of a four-bit shift register 642 and to the clock input of another D-type flip-flop 644. The output of the AND gate 638 asserts a signal CLR_BIT to the reset input of the flip-flop 640. The QB output signal from the flip-flop 614 is provided to the enable inputs of the flip-flop 640, the shift register 642 and the flip-flop 644. The RESET signal is provided to the reset inputs of the shift register 642 and the flip-flop 644, and to the preset input of the flip-flop 646. Thus, the OUT signal is initially asserted high since the output flip-flop 646 is preset.

The Q output of the flip-flop 640 is provided to the shifted input of the shift register 642. The shift register 642 is preferably a four-bit register Q[0:3] for implementing several commands, although the size of the shift register 642 may be smaller or larger, depending upon the number of desired commands. Due to the fact that commands are serially shifted into the shift register, not all combinations are available as commands. The 0000 state, for example, is the reset or initial state, so that it would not be available as a normal command. The serial register 642 serves to hold the decode or address portion of the command, which is preceded by a command data bit shifted into the flip-flop 644. Thus, the number of commands are limited to a decoding scheme which assures that five bits have been shifted through. For example, a shift-decoding scheme could be used which requires that the two least significant bits (LSBs) or Q[2,3] of each address be set to 01, to assure that all five bits have been received where the two most significant bits (MSBs) identify the particular command for a total of four commands. Of course, other shift-decoding schemes are possible and the size of the shift register 642 is increased if more commands are desired. The shift register 642 provides its four bits as output signals REGQ0, REGQ1, REGQ2 and REGQ3, where the bits shifted into the shift input correspond to the REGQ0 signal, and then serially shifted right to the LSB or REGQ3. The REGQ3 signal is provided to the D input of the flip-flop 644, having its Q output provided to the D input of the flip-flop 646, which asserts its Q output to the output of the PAL 600. It is noted that the flip-flop 646 continues to assert its present state at its output until clocked while enabled. Thus, the enable input of the flip-flop 646 enables it to latch a new bit, where its output is always asserted. The REGQ0 and REGQ3 signals are provided to two-inputs of a four-input AND gate 652, having its output asserting an output enable signal OUT_EN, which is provided to the enable input of the flip-flop 646. The REGQ1 signal is provided to the input of an inverter 648, having its output provided to a third input of the AND gate 652. The REGQ2 signal is provided to the input of an inverter 650, having its output provided to the fourth input of the AND gate 652. The inverters 648, 650 and the AND gate 652 serve as decode logic for the address portion of a command within the shift register 642. Operation of the command decode circuit 308 shown in FIG. 6 is described with reference to a timing diagram shown in FIG. 7. Upon power up of the circuitry, which occurs when the FP signal is asserted, the capacitor 604 grounds the input of the inverter 610, asserting the RESET signal to preset the flip-flops 612, 614 and 646 and to reset the shift register 642 and the flip-flop 644. The flip-flops 612, 614 for a two-bit state machine 615, which is preset to binary 11 so that the QA and QB signals are both initially set to one. The shift register 642 is cleared to binary 0000. The OUT signal is initially asserted high, which is the embodiment shown, keeps the power supply 312 tamed off, although it continues to provide the FP signal. The power supply 312 generally provides power to the main circuitry (not shown) of the slave device 206 or 208 when activated. The CMD signal eventually falls to zero so that the AND gate 638 asserts the CLR_BIT high to reset the flip-flop 640.

Figure 7:
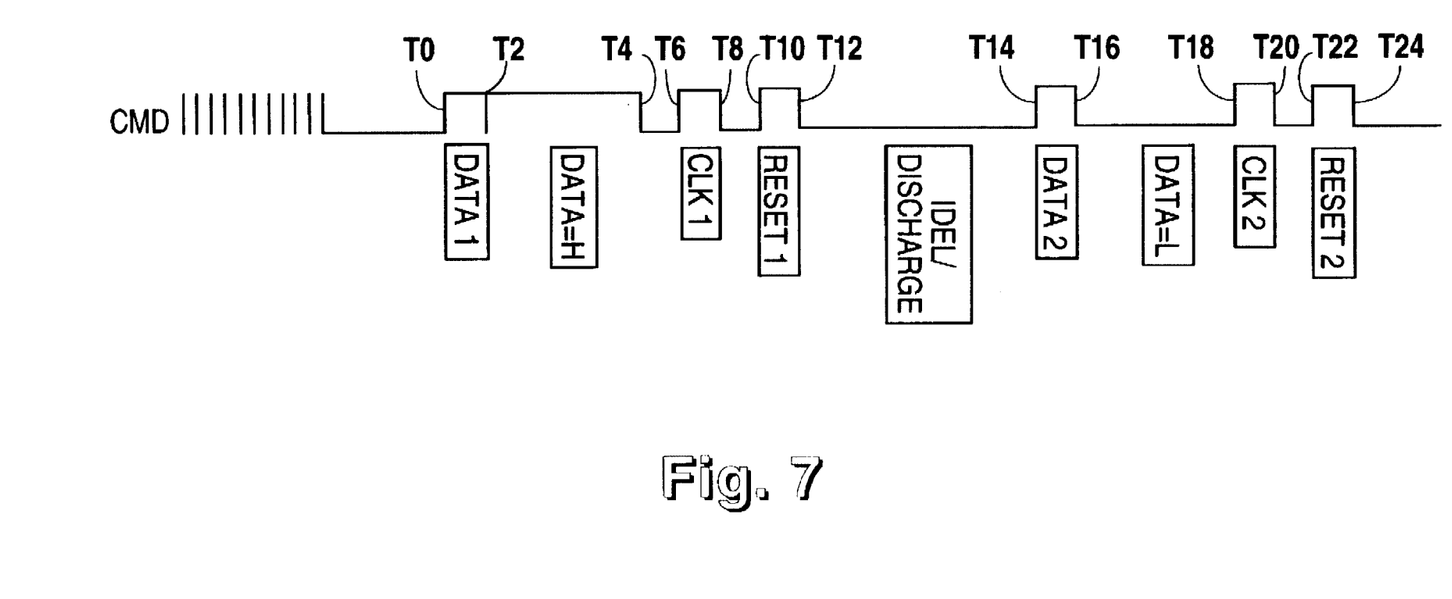
FIG. 7 is a timing diagram illustrating the communication protocol used by the command decode circuit shown in FIG. 6.

At a subsequent time T0, a start or data pulse asserted by a master causes the CMD signal to be asserted high, thereby clocking the state machine 615 into the binary 00 state, so that the QA and QB signals both fall to zero. The initial data pulse causes the QA signal to go low, which removes the reset state of the flip-flop 640. However, the QB signal disables the flip-flops 640, 644 and the shift register 642. Since QB is now low, the AND gate 622 is enabled to receive a data bit from the CMD signal for sampling by the sample and hold circuit 606.

As described previously, the data bit is incorporated within the data pulse. The data period begins at a time T2, where a bit of data asserted by a master is asserted between times T2 and T4, where this data bit may be either high or low. If high, there is no glitch and the CMD signal remains high as shown in FIG. 7, so that the initial data pulse appears as a longer pulse. A data bit asserted high causes the BIT signal to be asserted high, which causes the capacitor 632 to be charged through the resistor 628. A master (through the slave's pulse detection logic) thus asserts CMD signal high for a sufficient time to enable charging of the capacitor 632. The inverter 635 correspondingly asserts the SCHOUT signal high. The Schmitt triggering inverters 634 and 635 allow proper filtering and shaping of the data bit to the input of the flip-flop 640. The Schmitt trigger inverters 634, 635 include hysteresis for relatively sharp rise and fall times, so that a sluggish rise or fall of the CMD signal does not impact the flip-flop 640.

The CMD signal is asserted low either before or just after the data bit and is thus low at time T4. Note that the flip-flop 640 is not clocked since the QB signal disables it. A subsequent clock pulse is asserted high by a master at time T6, which clocks the state machine 612, 614 to the binary 01 state so that QA is low and QB is high. This disables the AND gate 622 thereby isolating the sample and hold circuit 606, and the AND gate 638 enables the flip-flop 640 to receive data. The clock pulse is deasserted low at time T8, thereby clocking the S_BIT data asserted on the SCHOUT signal into the flip-flop 640.

After the clock pulse is deasserted low at time T8, a reset pulse is asserted on the CMD signal at time T10, which resets the state machine 612, 614 into the binary 11 state causing a rising edge on the QA signal. Since the shift register 642 is enabled and clocked at the rising edge of the QA signal, all of its internal bits are shifted to the right and it receives the output of the flip-flop 640 at its serial input. The flip-flop 644 is also enabled and clocked with the shift register 642, and clocks in the LSB of the shift register 642, or the REGQ3 signal. The flip-flop 644 thus acts as a fifth register bit for eventually receiving the command bit of a five-bit command. In fact, a five bit shift register could be used instead of a four bit shift register and flip-flop. The reset pulse is asserted low at time T12, thereby initiating a discharge state for discharging the capacitor 632 through the resistor R2. The discharge path is only through resistor 630 because of the diode 626. The discharge period has sufficient duration for completely discharging the capacitor 632. After the discharge period, a new data period begins, where a second data pulse is asserted at time T14. Operation continues in a similar fashion as described above, where a new data period begins at time T16 and eventually ends followed by a clock pulse at time T18. In this case, the data bit is low, so that the initial data pulse is shorter than the initial data pulse incorporating a high data bit. Also, the capacitor 632 is discharged for asserting the SCHOUT signal low to the flip-flop 640. The clock pulse between times T18 and T20 causes the S_BIT data bit on the SCHOUT signal to be clocked into the flip-flop 640 and a corresponding reset pulse occurs between times T22 and T24 to shift the data bit into the shift register 642.

Operation continues in a similar fashion until the master device has sent five (5) data bits, the first being the command bit and the following four (4) bits being the address portion for decoding purposes. On the rising edge of the reset pulse for the fifth and last data bit, the command bit is latched into the flip-flop 644, so that the address portion is fully shifted into the shift register 642. The decode logic comprising the inverters 648, 650 and the AND gate 652 form a decode address of binary 1001, which determines whether the command bit is executed within the particular slave. Thus, if the value in the shift register 642 is 1001, the AND gate 652 enables the flip-flop 646, and the falling edge of the final reset pulse clocks the data bit into the flip-flop 646. The data bit is asserted as the OUT signal from the PAL 600.

As described above, the OUT signal is initially asserted high disabling the power supply 312. If the new data bit is a logic low and the decode command is 1001, then the OUT signal is asserted low for turning on the power supply 312, and thus the slave 206. The OUT signal remains asserted low and the power supply 312 turned on until a new high data bit is sent along with the decode command 1001, in response to which the OUT signal is asserted high and the power supply 312 is turned off.

It is clear that the PAL 600, or any other specific implementation, could include other decode logic for decoding other command addresses in a similar fashion. Each of the slave devices 206 include whatever decoding logic is desired. Furthermore, a similar RC circuit, PAL and sample and hold circuit is provided within each of the slave devices 208 for receiving and decoding data and commands from its internal CMD_STATUS2. The second master device 202b asserts negative pulses on the M_PRESENT signal for sending commands to the slave devices 208 without affecting the slave devices 206.

It is appreciated that a communication system according to the present invention enables low cost communications between up to two master devices and a plurality of up to two different types of slave devices without affecting the existing cabling scheme. Detection circuitry detects positive pulses on a normally static digital line for one type of slave device and negative pulses for a second type of slave device.

Furthermore, a predetermined self-clocking communication protocol is established for sending commands from master to slave devices. A series of clocking pulses are sent, where a data bit is combined with the first or initial data pulse. Each slave device includes state machine logic for detecting the data pulse and enabling a sample and hold or latch circuit to retrieve the incorporated data bit. A subsequent clock pulse asserted by the master clocks the data bits serially through a shift register and a flip-flop within the slave device. A final reset pulse resets the state machine to retrieve another bit.

Operation is repeated for each data bit sent until the full command is retrieved, which includes an initial command bit followed by several address decode bits. Decode logic decodes the address decode bits and enables an output flip-flop to receive the command bit as clocked by the final reset pulse. If so enabled, the command is performed.

It is appreciated that little or no software is required and external clocking schemes are entirely eliminated. This serves to substantially reduce the cost of a communication scheme according to the present invention.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A communication system, comprising:

a signal line;

at least one master device for sending a plurality of data bits on said signal line according to a self-clocking protocol, wherein said master device asserts a series of pulses on said signal line for each data bit, said series of pulses including a data pulse incorporating a data bit, a clock pulse and a reset pulse;

at least one slave device coupled to said signal line, each said slave device comprising:

a sample circuit coupled to said signal line for sampling said data bit when said sample circuit is enabled;

memory for storing said data bit; and control logic coupled to said sample circuit and said memory for detecting said data pulse and correspondingly enabling said sample circuit, for detecting said clock pulse for disabling said sample circuit from further sampling said signal line and enabling said memory to receive said data bit from said sample circuit, and for detecting said reset pulse for resetting said control logic.

2. The communication system of claim 1, wherein said signal line is a static digital signal line.

3. The communication system of claim 2, wherein each said slave device further comprises:

a pulse detection circuit for detecting pulses asserted on said static line and for asserting corresponding command pulses.

4. The communication system of claim 3, further comprising:

a first master device for asserting positive pulses on said signal line;

a second master device for asserting negative pulses on said signal line;

a first slave device including a first pulse detection circuit for detecting said positive pulses but rejecting said negative pulses; and a second slave device including a second pulse detection circuit for detecting said negative pulses but rejecting said positive pulses.

5. The communication system of claim 4, wherein said first pulse detection circuit comprises:

a rectifier coupled to said signal line to be forward biased by said positive pulses;

an enhancement-mode field-effect transistor (FET) coupled to said rectifier; and a Schmitt trigger device coupled to said FET for asserting said command pulses.

6. The communication system of claim 4, wherein said first pulse detection circuit comprises:

a rectifier coupled to said signal line to be forward biased by said positive pulses;

cross-coupled inverters coupled as a hysteresis feedback circuit; and an inverter coupled to said cross-coupled inverters for asserting said command pulses.

7. The communication system of claim 4, wherein said second pulse detection circuit comprises:

a rectifier coupled to said signal line to be forward biased by said negative pulses;

an depletion-mode field-effect transistor (FET) coupled to said rectifier to be turned on while said rectifier is reversed-biased and to be turned off when said rectifier is forward biased; and a Schmitt trigger device coupled to said FET for asserting said command pulses.

8. The communication system of claim 4, wherein said second pulse detection circuit comprises:

a Zener diode having its anode coupled to said signal line;

a source voltage coupled to said cathode of said Zener diode; and a hysteresis feedback circuit comprising cross-coupled inverters coupled to said cathode of said Zener diode for asserting said command pulses.

9. The communication system of claim 1, wherein said sample circuit comprises:

a resistor-capacitor circuit for sampling said data bit; and at least one Schmitt trigger buffer coupled to said resistor-capacitor circuit for asserting said data bit.

10. The communication system of claim 9, wherein said sample circuit further comprises:

a rectifier for sensing said data bit;

said resistor-capacitor Circuit comprising:

a first resistor including first and second ends having said first end coupled to said rectifier;

a second resistor coupled between said second end of said first resistor and ground; and a capacitor coupled between said second end of said first resistor and ground; and wherein said at least one Schmitt trigger buffer comprises two series coupled Schmitt trigger inverters having an input coupled to said capacitor and an output for asserting said data bit.

11. The communication system of claim 1, further comprising:

said master device sending said plurality of data bits forming a command including a command bit and a plurality of corresponding address bits; and said slave device further comprising:

an output flip-flop having an input for receiving said command bit and an output for asserting said command bit, said output flip-flop being clocked in response to pulses on said signal line when said output flip-flop is enabled;

wherein said memory comprises shift memory having an input coupled to said sample circuit and an output coupled to said input of said output flip-flop, said shift memory for receiving and serially shifting said command bit and said corresponding address bits;

decode logic coupled to said shift memory and said output flip-flop for detecting a predetermined address and for enabling said output flip-flop to receive said command bit; and said control logic further clocking said shift memory to serially shift data bits in response to said reset pulse.

12. The communication system of claim 11, wherein said shift memory comprises:

a data flip-flop having an input coupled to said sample circuit and having an output, said data flip-flop being enabled by said control logic and clocked in response to pulses on said signal line; and a shift register having a serial input coupled to said output of said data flip-flop and having a serial output, said shift register being enabled and clocked by said control logic for serially shifting a plurality of stored bits between said input and output;

wherein said output flip-flop has an input coupled to said serial output of said shift register, said output flip-flop being clocked in response to pulses on said signal line and being enabled by said decode logic when said corresponding address bits stored in said shift register match said predetermined address.

13. The communication system of claim 12, wherein said shift register stores five bits including a command bit and four address bits.

14. The communication system of claim 12, further comprising:

said signal line normally being deasserted low wherein said pulses are asserted high;

said control logic comprising a state machine being clocked upon rising edges of said pulses; and an inverter having an input coupled to said signal line for asserting inverted pulses to the clock inputs of said data flip-flop and said output flip-flop, which are clocked upon rising edges of said inverted pulses.

15. The communication system of claim 14, wherein said control logic comprises:

a clocking flip-flop for asserting clock pulses to said shift register; and an enabling flip-flop for asserting an enable signal to enable said sample circuit when said enable signal is deasserted and to enable said data flip-flop and said shift register when said enable signal is asserted.

16. A communication system, comprising:

a signal line;

at least one master device for sending a plurality of data bits on said signal line according to a self-clocking protocol, wherein said master device asserts a series of pulses on said signal line for each data bit, said series of pulses including a data pulse incorporating a data bit, a clock pulse and a reset pulse;

at least one slave device coupled to said signal line, each said slave device comprising:

means for sampling said data bit;

means coupled to said sampling means for storing said data bit; and control means for detecting said data, clock and reset pulses for enabling said sampling means to sample said data bit and for enabling said data bit storing means to store said data bit.

17. The communication system of claim 16, further comprising:

said master device sending said plurality of data bits forming a command including a command bit and a plurality of corresponding address bits; and said slave device further comprising:

means for receiving said command bit in response to pulses asserted on said signal line when said receiving means is enabled;

said storing means for storing said corresponding address bits when enabled; and decoding means coupled to said storing means and said command bit receiving means for decoding a predetermined address and for enabling said command bit receiving means to receive said command bit;

wherein said decoding means further enables Said storing means to receive each address bit in response to corresponding reset pulses.

18. The communication system of claim 16, further comprising:

a first master device for asserting positive pulses on said signal line;

a second master device for asserting negative pulses on said signal line;

a first slave device including a first pulse detection circuit for detecting said positive pulses but rejecting said negative pulses; and a second slave device including a second pulse detection circuit for detecting said negative pulses but rejecting said positive pulses.

19. A method of superimposing self-clocking signals on a signal line from a master device to at least one slave device, comprising the steps of:

the master device incorporating a data bit into a data pulse;

the master device asserting the data pulse, a clock pulse and a reset pulse on the signal line;.

the slave device detecting the data pulse and sampling the data bit;

the slave device latching the data bit in response to the clock pulse; and the slave device storing the data bit into memory in response to the reset pulse.

20. The method of claim 19, wherein said detecting and sampling step comprises the steps of:

enabling a sample and hold circuit upon an initial transition of the data pulse; and the sample and hold circuit sampling the remainder of the data pulse.

21. The method of claim 20, wherein said step of sampling the remainder of the data pulse comprises the step of charging or discharging a capacitor.

22. The method of claim 19, wherein said latching step comprises the steps of:

enabling a flip-flop on an initial transition of the clock pulse; and clocking the flip-flop on a following transition of the clock pulse.

23. The method of claim 22, wherein the memory is serial shift memory, wherein said step of storing the data bit comprises the steps of:

providing the data bit from the flip-flop to shift memory; and clocking the shift memory to receive the data bit on an initial transition of the reset pulse.

24. The method of claim 23, further comprising the steps of:

the master device asserting a plurality of pulses for sending a plurality of data bits forming a command including a command bit and a plurality of address bits;

the slave device receiving and storing the command and address bits into the shift memory;

the slave device comparing the address bits stored in the memory with a predetermined address code;

the slave device asserting the command bit from the memory if the stored address bits match the predetermined address code.

25. The method of claim 24, wherein said step of asserting the command bit comprises the steps of:

enabling a command flip-flop to receive the command bit from the memory if the stored address bits match the predetermined address code; and clocking the command flip-flop to receive the command bit on the following transition of the reset pulse when the command flip-flop is enabled.

* * * * *